(12) United States Patent
Lauter et al.

(10) Patent No.: US 7,382,876 B2
(45) Date of Patent: Jun. 3, 2008

(54) HASH FUNCTION CONSTRUCTIONS FROM EXPANDER GRAPHS

(75) Inventors: Kristin E. Lauter, La Jolla, CA (US);
Denis X Charles, Redmond, WA (US);
Eyal Zvi Goren, Montreal (CA)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 11/263,701

(22) Filed: Nov. 1, 2005

(65) Prior Publication Data

US 2007/0098150 A1    May 3, 2007

(51) Int. Cl.
*H04L 9/28* (2006.01)

(52) U.S. Cl. .......................... 380/28; 380/37; 380/42; 713/179; 713/181

(58) Field of Classification Search ................ 380/28, 380/37, 42; 713/179, 181
See application file for complete search history.

(56) References Cited

U.S. PATENT DOCUMENTS

| | | | |
|---|---|---|---|
| 5,515,307 A * | 5/1996 | Aiello et al. ................ | 708/254 |
| 6,104,811 A | 8/2000 | Aiello et al. | |
| 6,757,686 B1 | 6/2004 | Syeda-Mahmood et al. | |
| 7,120,856 B2 * | 10/2006 | Zhang et al. ................ | 714/801 |
| 2005/0071335 A1 | 3/2005 | Kadatch | |
| 2005/0175176 A1* | 8/2005 | Venkatesan et al. .......... | 380/42 |

OTHER PUBLICATIONS

Newman et al, Perfect Hashing, Graph Entropy, and Circuit Complexity, CH2899-3/90/0000/0091$01.00 @ 1990 IEEE.*
Miller et al, Ramanujan Graphs and the Random Reducibility of Discrete Log on Isogenous Elliptic curves, Nov. 2004.*
PCT International Search Report and Written Opinion and dated Feb. 26, 2007, from counterpart PCT patent application Serial No. PCT/US2006/040538, copy attached, 9 pages.

* cited by examiner

*Primary Examiner*—Nasser Moazzami
*Assistant Examiner*—Fatoumata Traore
(74) *Attorney, Agent, or Firm*—Lee & Hayes, PLLC (57) ABSTRACT

Hash function constructions from expander graphs are described. In one aspect, an expander graph is walked to compute a hash function. The expander graph is walked using respective subsets of an input message. A label of a last vertex walked is an output of the hash function.

17 Claims, 4 Drawing Sheets

HASH FUNCTION CONSTRUCTIONS FROM EXPANDER GRAPHS

BACKGROUND

Hash functions constructions are used in many algorithms and cryptographic protocols. They are functions $f: U \rightarrow S$ with $|U| \geq |S|$ that distribute their image "uniformly". In other words for most $$x \in U, |\{y \in U \mid f(x) = y\}| \text{ is close to } \frac{|U|}{|S|}.$$

Hash functions that minimize the number of colliding pairs i.e., pairs (x, y) such that $f(x)=f(y)$ are very useful. For cryptographic applications of hash functions, it is typically desired for the problem of engineering collisions to be hard. This means the task of finding distinct elements x and y such that $f(x)=f(y)$ is computationally hard. Often, there is interest in the following weaker property: Given x finding another y such that $f(x)=f(y)$ is hard.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, hash function constructions from expander graphs are described. In one aspect, an expander graph is walked as input to a hash function. The expander graph is walked using respective subsets of an input message. The output of the hash function is the label of the last vertex walked.

BRIEF DESCRIPTION OF THE DRAWINGS

In the Figures, the left-most digit of a component reference number identifies the particular Figure in which the component first appears.

DETAILED DESCRIPTION

Overview

Systems (e.g., systems, apparatus, computer-readable media, etc.) and methods for hash function constructions from expander graphs are described below in reference to FIGS. 1 through 4. A hash function is constructed by taking walks on specific expander graphs. A random walk on an expander graph mixes very fast, so the hash function output is generally uniform when the input message is uniformly random. In one implementation, the systems and methods use extractors in conjunction with expander graphs to produce hash functions. In this implementation, input messages have a certain lower bound on the min-entropy. For example, cryptographically signing a message (which is done by hashing) is done after adding a "random pad" to the message. (This process injects entropy into the signature). Under the assumption that the input messages have some small amount of entropy, an extractor is utilized to extract this randomness and then execute a walk according to the output of the extractor.

These and other aspects of the systems and methods for hash function construction from expander graphs are now described in greater detail.

An Exemplary System

Although not required, the systems and methods for hash function constructions from expander graphs are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
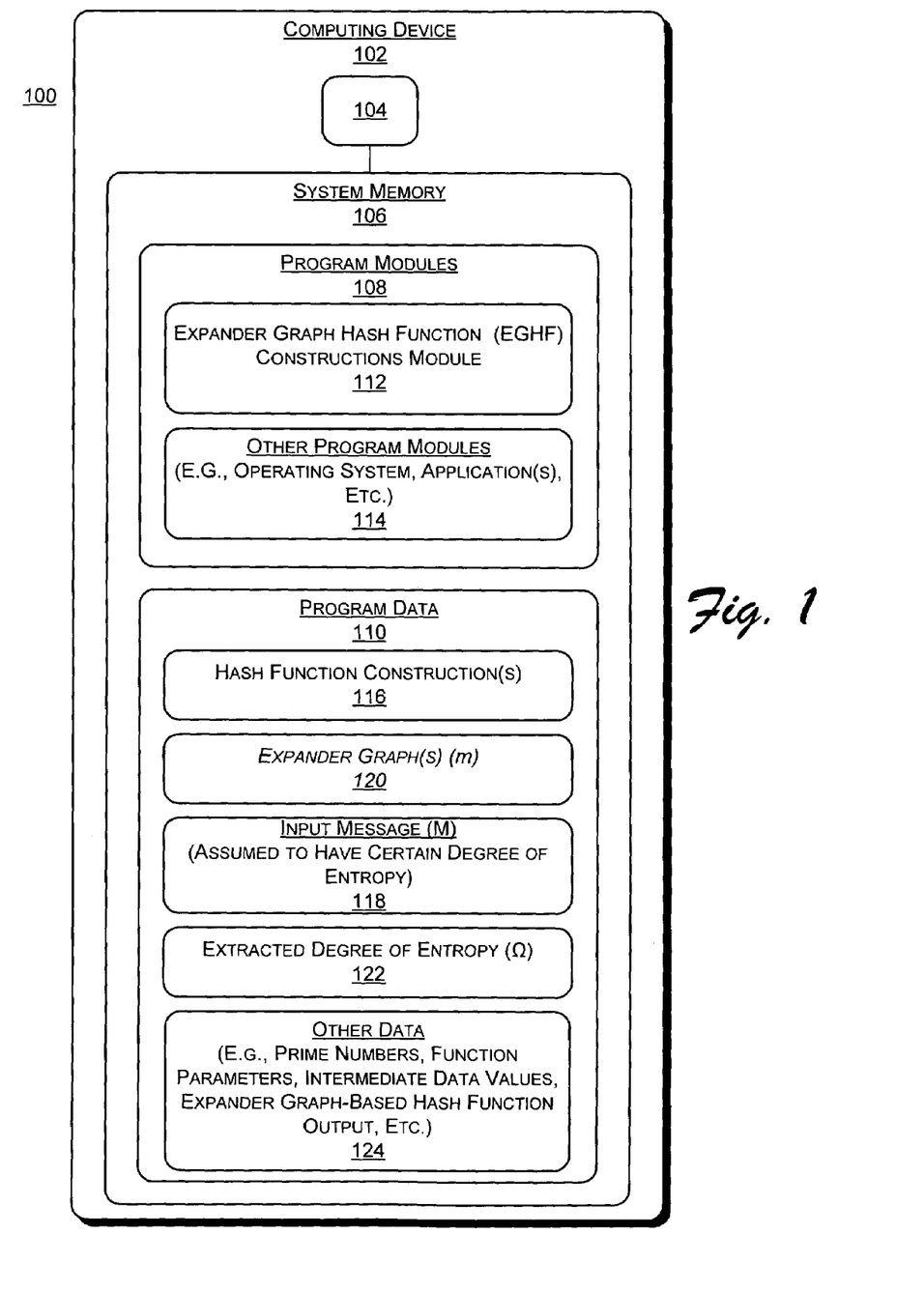
FIG. 1 illustrates an exemplary system for hash function constructions from expander graphs, according to one embodiment.

FIG. 1 illustrates an exemplary system 100 for hash function constructions from expander graphs, according to one embodiment. System 100 includes computing device 102, which includes one or more processing units 104 coupled to a system memory 106. Processor 104 fetches and executes computer-program instructions from program modules 108, and fetches and stores data to/from program data 110 portion of system memory 106. Program modules 108 include, for example, expander graph hash function construction module ("EGHF construction module") 112 and other program modules 114. Other program modules 114 include, for example, an operating system and one or more applications that utilize expander graph-based hash function constructions 116 generated by module 112. There are many applications for which such hash function constructions 116 are useful. For example, such constructions may be utilized in one or more applications implementing cryptography, hash tables, error correction, audio identification, Rabin-Karp string search algorithms, etc.

EGHF construction module 112 generates hash function constructions 116 from an input message 118 and an expander graph 120 of n vertices. Expander graph 118 is a sparse graph with high vertex or edge expansion, or in other words highly connected. In one implementation, expander graph 118 is a Ramanujan graph. In one implementation, the input message 118 has a degree of randomness (or entropy).

For example, in one implementation, expander graph 120 is determined as follows. Let p be a prime number and let l ($\neq$p) be another prime number. The expander graph G(p, l) has as its vertex set V the set of supersingular j-invariants over the finite field $F_q$, $q=p^2$. There is an edge between the vertices $j_1$ and $j_2$ if there is an isogeny of degree l between the supersingular elliptic curves whose j-invariants are $j_1$ and $j_2$. The graph G(p, l) is known to be a l+1 regular Ramanujan graph. The number of vertices of G(p, l) is the class number of the quaternion algebra $B_{p,\infty}$ which is about p/12. G(p, l) is the expander graph 120.

In another implementation, expander graph 120 is a Lubotzky-Phillips-Sarnak expander graph, as described below in the section titled "Alternate Embodiments".

To generate hash function constructions 116, expander graph hash function construction module 112 identifies a message 118. In one implementation, the message has a degree of entropy. EG HF construction module 112 assigns respective names, or labels to each vertex of the n vertices that comprise the expander graph 120. When the input message has a degree of entropy associated with it, EG HF construction module 112 extracts (determines) that degree of randomness with an extractor function. Exemplary such extraction functions and technique to extract randomness from such a message is described in greater detail below in the section titled "Extracting Randomness from the Input".

Construction module 112 identifies k-length bit segments of the input message 118 based either on the extracted degree of entropy (when present) or other objective criteria (described below), in view of a configurable vertex edge convention to identify vertices of the expander graph 120 to randomly walk (visit). Exemplary operations to walk and expander graph 120 are described in greater detail below in the section titled "Exemplary Procedure". A respective name/label associated with a last vertex of the vertices walked represents the output of the hash function construction 114.

Extracting Randomness from the Input

Min-Entropy: Let X be a random variable that takes values in $\{0, 1\}^n$. The min-entropy of X is defined to be the quantity $$\min_{x \in \{0,1\}^n} (-\log(Pr[X = x])).$$

Closeness of distributions: Let X and Y be two distributions on $\{0, 1\}^d$. They are said to be $\epsilon$-close (where $\epsilon$ is a real number) if $$\max_{x \in \{0,1\}^d} \left| Pr[X = x] - Pr[Y = x] \right| \leq \varepsilon.$$

Extractor: A function Ext: $\{0,1\}^n \times \{0,1\}^d \to \{0,1\}^m$ is called a $(k,\epsilon)$-extractor if for any random variable X on $\{0, 1\}^n$ of min-entropy at least k and $U_d$ the uniform distribution on $\{0,1\}^d$ the distribution Ext(X, $U_d$) is $\epsilon$-close to $U_m$.

Proposition: If Ext: $\{0,1\}^n \times \{0,1\}^d \to \{0,1\}^m$ is a $(k,\epsilon)$-extractor. Then for most choices of the random seed $\sigma \in \{0, 1\}^d$ the distribution Ext(X, $\sigma$) is $\epsilon$-close to $U_m$.

Proof: The distribution Ext(X, $U_d$) can be described as choosing a distribution uniformly at random among the family $X_d$ of distributions indexed by $\sigma \in \{0,1\}^d$ defined by $X_\sigma$=Ext(X, $\sigma$). The fact that Ext is an extractor implies that many of these distributions are $\epsilon$-close to $U_m$. (End of proof).

Constructions of polynomial time extractors are known for any $k > n^\gamma$ ($\gamma < 1$) and $\epsilon > 0$ if d is at least $\log^2 n$ and $m = k^{1-\alpha}$ where $\alpha$ is any real number.

Construction of the Hash Function

Random variable M (i.e., input message 118), which denotes the inputs to the hash function construction 116, has min-entropy at least $\log^{1+\beta} n$ where n is the number of vertices of G(p, 1) and $\beta > 0$. Let $\{0,1\}^N$ be the input space. To determine the degree of entropy 122 of M, construction module 112 implements an extractor function Ext and fixes the function Ext: $\{0,1\}^N \times \{0,1\}^d \to \{0,1\}^m$ with parameters $k = \log^{1+\beta} n$, $\epsilon$ very small and $m = \Theta(\log^{1+\alpha} n)$. For purposes of exemplary illustration, such parameters are shown as respective portions of "other data" 124. System 100 assumes that $N = k^{O(1)}$. Construction module 112 picks a uniformly at random from $\{0, 1\}^d$. Given an input $x \in \{0,1\}^N$, construction module 112 computes $\overline{\omega}$=Ext(x,a) (i.e., degree of entropy 122). The result of this construction is a string of size m. Construction module 112 executes a walk on m starting at some fixed vertex $v_0$ following the directions given by $\overline{\omega}$ and the output of the hash function 116 is the label of the final vertex in the walk.

For the expander graph whose nodes are supersingular elliptic curves modulo a prime p, and edges are isogenies of degree 1 between elliptic curves, we can take steps of a walk around the graph as follows:

Beginning at a node corresponding to the elliptic curve E, first find generators P and Q of the 1-torsion of E[1]. To this end:

1. Let n be such that $F_q$ (E[1]) $\subseteq F_{q^n}$.
2. Let S=éE($F_{q^n}$); the number of $F_{q^n}$ rational points on E. (Original)
3. Set $s = S/1^k$, where $1^k$ is the largest power of 1 that divides S (note $k \geq 2$).
4. Pick two points P and Q at random from E[1]:
    (a) Pick two points U,V at random from E($F_{q^n}$)
    (b) Set P'=sU and Q'=sV, if either P' or Q' equals O then repeat step (i).
    (c) Find the smallest $i_1, i_2$ such that $1^{i_1}P' \neq O$ and $1^{i_2}Q' \neq O$ but $1^{i_1+1}P'=O$ and $1^{i_2+1}Q'=O$.
    (d) Set P=$1^{i_1}$P' and Q=$1^{i_2}$Q'.
5. Using the well-known Shanks's Baby-steps-Giant-steps algorithm, determine if Q belongs to the group generated by P. If so, step (d) is repeated.

The j-invariants in $F_{p^2}$ of the 1+1 elliptic curves that are isogenous to E are $j_1, L, j_{1+1}$. To find them:
    (a) Let $G_1$=<Q> and $G_{1+i}$=<P+(i-1)*Q> for $1 \leq i \leq 1$.
    (b) For each i, $1 \leq i \leq 1+1$ compute the j-invariant of the elliptic curve E/$G_i$ using Vélu's formulas.

If we use the graph of supersingular elliptic curves with 2-isogenies, for example, we can take a random walk in the following explicit way: at each step, after finding the 3 non-trivial 2-torsion points of E, order them in terms of their x-coordinates in a pre-specified manner. Then use the input bits to the hash function to determine which point to choose to quotient the elliptic curve by to get to the next node in the walk.

Proof that Output of Hash Function is Almost Uniform

By the Proposition the output of the extractor function implemented by expander graph hash function constructions module 112 is close to uniform and the walk we take on the expander graph 120 is very close to being a random walk. (The walk being random just means that being at some vertex v on the graph, we are equally likely to be at any of its neighbors at the next step). Now since the graph G(p, 1) has n vertices, and $m = \Omega(\log^{1+\alpha} n)$ the walk mixes rapidly and the output vertex is very close to uniform. Next, we make the above statements precise. One way to state that a random walk of O(log n) steps on a d-regular graph G (say) of n vertices mixes rapidly is to say that $$\left\|\left(\frac{1}{d}A\right)^{O(\log n)} \cdot v - \frac{1}{n}\vec{1}\right\| \leq \varepsilon,$$

where $\varepsilon$ is small, A is the adjacency matrix of G, v may be taken as any of the standard unit vectors and $\vec{1}$ is the vector (1, 1, . . . , 1). The matrix $$\frac{1}{d}A$$

can be thought of as the transition matrix of a uniformly random Markov chain on the graph 120. In this implementation, system 100 implements an almost random walk on the graph 120. This can be thought of as using a matrix B as the transition matrix such that $$\left\|\frac{1}{d}A - B\right\| \leq \delta$$

and $\delta$ is a small real number (where the symbol $\|\ \|$ refers to the matrix norm). In other words, construction module 112 perturbs the random walk a small amount. The following proposition shows that this new random walk mixes quickly if $\delta$ can be taken small enough.

Proposition: Let A and B be two sub-stochastic matrices, then $\|A^k - B^k\| \leq k\|A - B\|$.

Proof: One can write the difference $A^k - B^k$ as $$\sum_{0 \leq i \leq k-1} A^{k-i-1}(A-B)B^i.$$

Taking norms on both sides and using the fact that $\|A\| = \|B\| = 1$ (as they are sub-stochastic matrices) one gets the result. (End of Proof).

Since the length of the random walk that we take is O(log n). If we can arrange the parameter $\delta$ to be as follows:

$$O\left(\frac{1}{\log^2 n}\right),$$

the resulting approximate random walk will also mix rapidly. This can be arranged by setting the parameter $\varepsilon$ of the extractor to be equal to the following:

$$O\left(\frac{1}{\log^2 n}\right).$$

Collision Resistance

Explicitly finding a collision under this hash function 116 is equivalent to finding two isogenies between a pair of supersingular elliptic curves of the same l-power degree. If the graph G(p, l) does not have small cycles then this problem is very hard, since constructing isogenies of high degree between curves is a well-known computationally hard problem.

ALTERNATIVE EMBODIMENTS

As an alternative to using the graph G(p, l) described above, system 100 utilizes the Lubotzky-Phillips-Sarnak expander graph 120. Let l and p be two distinct primes, with l a small prime and p relatively large. We also assume that p and l are $\equiv 1$ mod 4 and the l is a quadratic residue mod p (this is the case if $l^{(p-1)/2} \equiv 1$ mod p). We denote the LPS graph, with parameters l and p, by $X_{l,p}$. We define the vertices and edges that make up the graph $X_{l,p}$ next. The vertices of $X_{l,p}$ are the matrices in $PSL(2, F_p)$, i.e. the invertible 2×2 matrices with entries in $F_p$ that have determinant 1 together with the equivalence relation A=−A for any matrix A. Given a 2×2 matrix A with determinant 1, a name for the vertex will be the 4-tuple of entries of A or those of −A depending on which is lexicographically smaller in the usual ordering of the set $\{0, \ldots, p-1\}^4$. We describe the edges that make up the graph next. A matrix A is connected to the matrices $g_i A$ where the $g_i$'s are the following explicitly defined matrices. Let i be an integer satisfying $i^2 \equiv -1$ mod p. There are exactly 8(l+1) solutions $g = (g_0, g_1, g_2, g_3)$ to the equation $g_0^2 + g_1^2 + g_2^2 + g_3^2 = l$. Among these there are exactly l+1 with $g_0 > 0$ and odd an $g_j$, for j=1, 2, 3 is even. To each such g associate the matrix $$\begin{pmatrix} g_0 + ig_1 & g_2 + ig_3 \\ -g_2 + ig_3 & g_0 - ig_1 \end{pmatrix}.$$

This gives us a set S of l+1 matrices in $PSL(2, F_p)$. The $g_i$'s are the matrices in this set S. It is a fact that if g is in S then so is $g^{-1}$. Furthermore, since l is small the set of matrices is S can be found by exhaustive search very quickly.

An Exemplary Procedure

Figure 2:
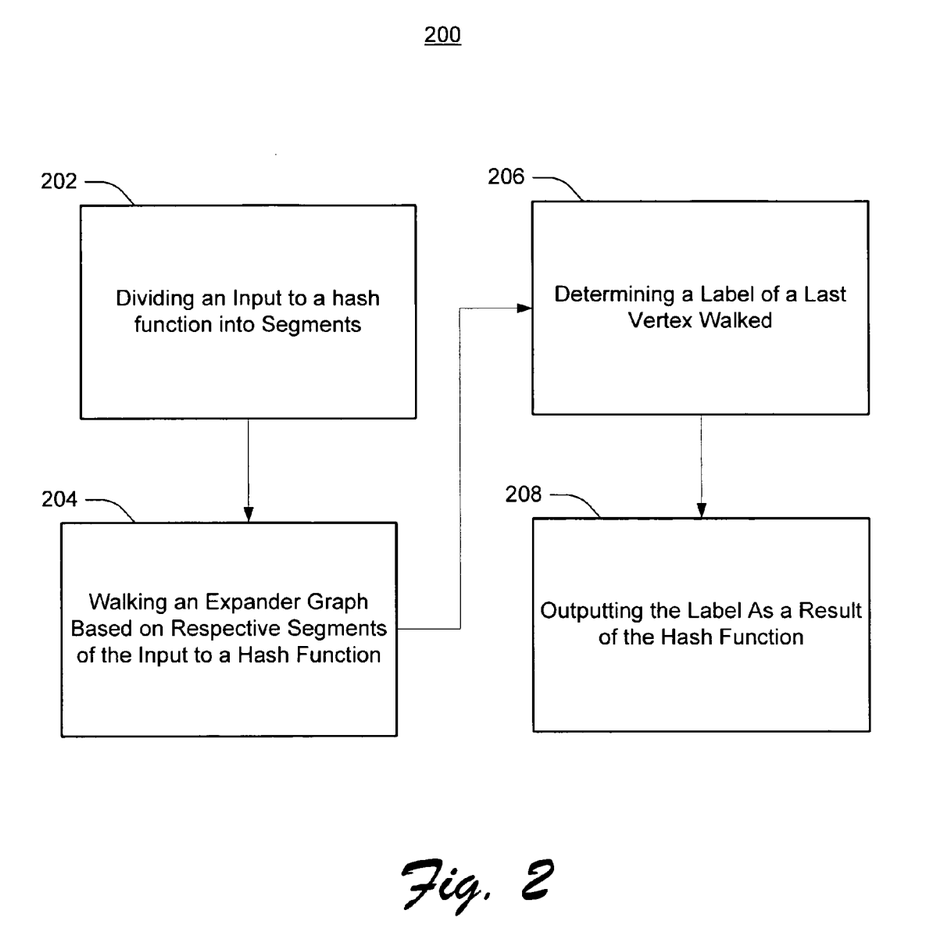
FIG. 2 shows an exemplary procedure for hash function constructions from expander graphs, according to one embodiment.

FIG. 2 shows an exemplary procedure 200 for hash function constructions from expander graphs, according to one embodiment. For purposes of exemplary description, the operations of procedure 200 are described with respect to components of system 100 of FIG. 1. The leftmost numeral of a component reference number indicates the particular figure where the component is first described.

At block 202, EG HF constructions module 112 (FIG. 1) divides an input message 118 into segments. For example, input message has a length N. Given that there are n vertices in a k-regular the expander graph 120 (each vertex having a name/label), the name of each edge coming out of any one vertex will have log k bits. The input message 118 is broken up into chunks of length log k. At block 204, EG HF constructions module 112 walks the expander graph 120 as input to a hash function. The walk is determined as follows: Suppose we are at some vertex v, the next vertex in the walk is determined by reading off the next chunk of log k bits from the input to determine the edge we will traverse out of vertex v, the other end point of this edge will be the next vertex on the walk. For example, EG HF constructions module 112 starts the random walk of edges in the expander graph 120 from a first vertex specified by the first k-bits (segment/chunk) of the input message 118. The next vertex walked in the expander graph 120 is specified by the next chunk of log k-bits. These operations are iteratively performed in view of a convention that specifies how the name of an edge corresponds to the vertices in the expander graph 120. An exemplary such convention is that for each vertex v, there is a function $f_v: \{1, K, k\} \rightarrow E$. Thus $f_v(1)$ is the first edge out of v, $f_v(2)$ is the second edge out of v, etc.

At block 206, EG HF constructions module 112 determines a label of a last vertex walked. At block 208, EG HF constructions module 112 outputs the label as a result of the hash function.

Figure 3:
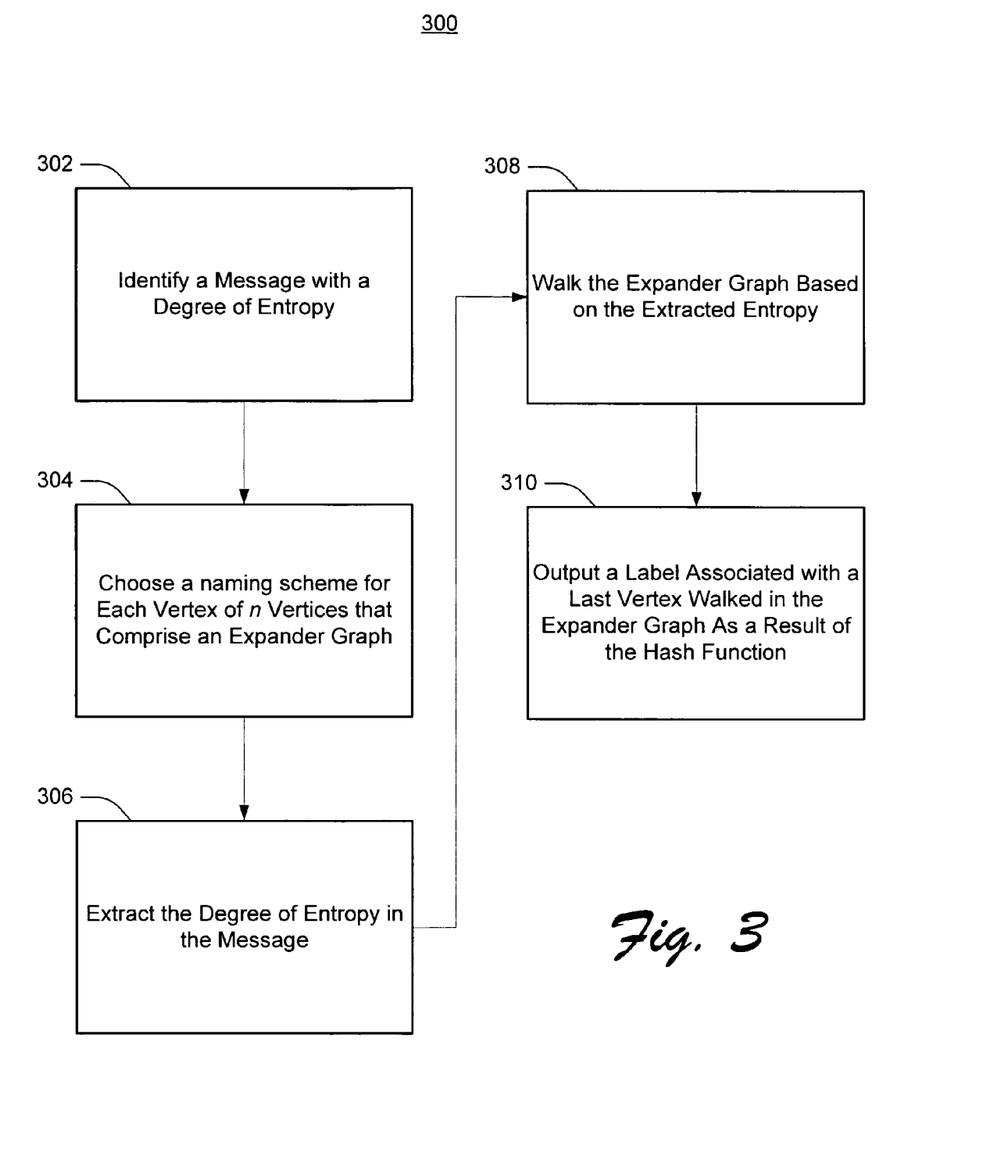
FIG. 3 shows an exemplary procedure for hash function constructions from expander graphs, according to one embodiment.

FIG. 3 shows an exemplary procedure for hash function constructions from expander graphs, according to one embodiment. For purposes of exemplary description, the operations of procedure 300 are described with respect to components of system 100 of FIG. 1. At block 302, expander graph hash function constructions module ("EGHF constructions module") 112 (FIG. 1), identifies a message 118 with a degree of entropy. At block 304, EGHF constructions module 112 assigns respective labels to each vertex in an expander graph 120. At block 306, EGHF constructions module 112 uses an extractor function to determine the degree of entropy in the input message 118. This determined degree is shown as the extracted degree of entropy 122. At block 308, EGHF constructions module walks the expander graph 120 based on the extracted degree of entropy 122. At block 310, EGHF constructions module 112 outputs a label associated with a last vertex walked and the expander graph 120 as a result of the hash function construction 116. That is, the operations of blocks 302 through 310 correspond to operations of hash function construction 116.

An Exemplary Operating Environment

Figure 4:
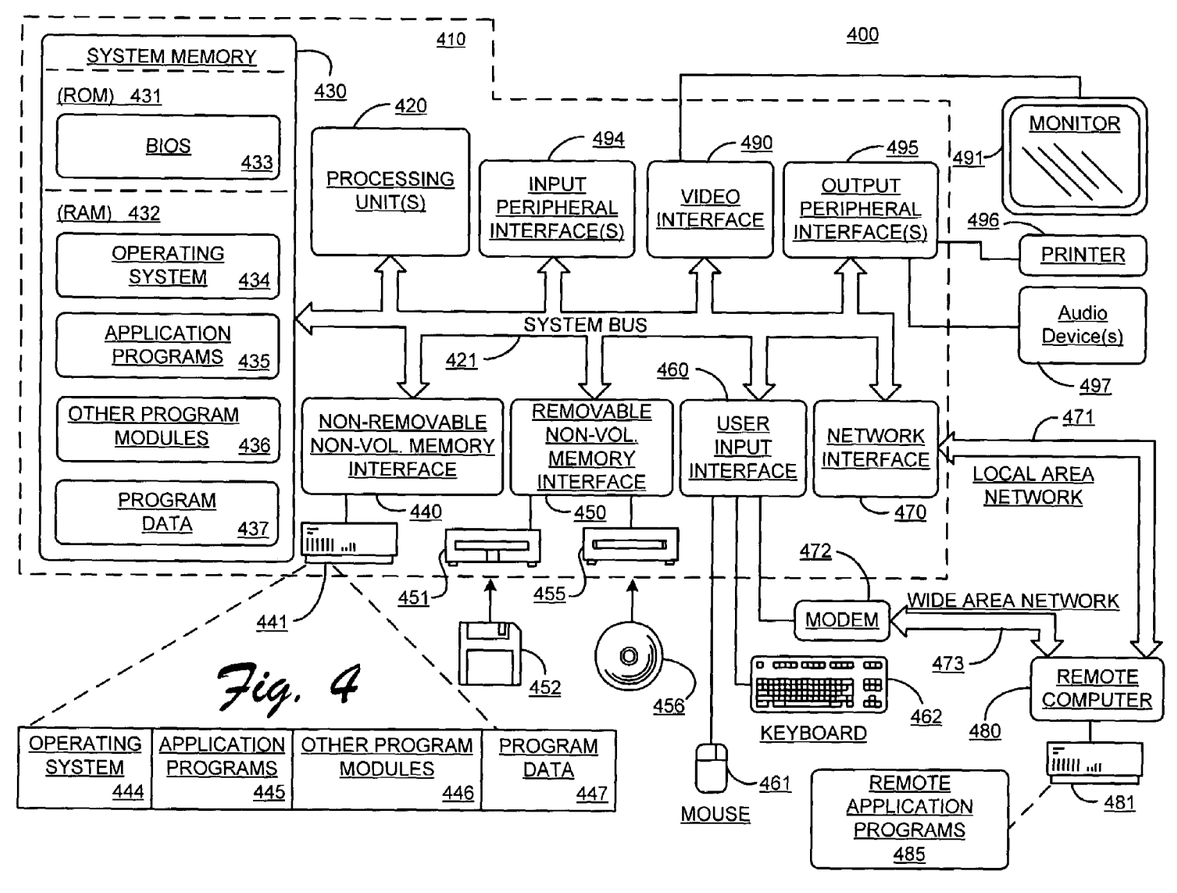
FIG. 4 illustrates an example of a suitable computing environment in which hash function constructions from expander graphs may be fully or partially implemented.

FIG. 4 illustrates an example of a suitable computing environment in which hash function constructions from expander graphs may be fully or partially implemented. Exemplary computing environment 400 is only one example of a suitable computing environment for the exemplary system of FIG. 1 and exemplary operations of FIGS. 2 and 3, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for hash function constructions from expander graphs includes a general purpose computing device in the form of a computer 410 implementing, for example, system 100 of FIG. 1. The following described aspects of computer 410 are exemplary implementations of computing devices 102 of FIG. 1. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 433, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 431 that reads from or writes to a removable, nonvolatile magnetic disk 432, and an optical disk drive 433 that reads from or writes to a removable, nonvolatile optical disk 436 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 431 and optical disk drive 433 are typically connected to the system bus 421 by a removable memory interface, such as interface 430.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 443, other program modules 446, and program data 447. Note that these components can either be the same as or different from operating system 434, application programs 433, other program modules 436, and program data 437. Application programs 433 includes, for example program modules 108 of computing device 102 of FIG. 1. Program data 437 includes, for example, program data 110 of computing device 102 of FIG. 1. Operating system 444, application programs 443, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as printer 496 and audio device(s) 497, which may be connected through an output peripheral interface 493.

The computer 410 may operate in a networked environment using logical connections to one or more remote computers, such as a remote computer 480. In one implementation, remote computer 480 represents computing device 102 or networked computer 104 of FIG. 1. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 483 as residing on memory device 481. The network connections shown are exemplary and other means of establishing a communications link between the computers may be used.

CONCLUSION

Although the systems and methods for hash function construction from expander graphs have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
    walking an expander graph according to input to a hash function, the expander graph being walked using respective subsets of an input message, wherein the input message is divided into segments, wherein for at least a subset of these segments, a path to a next respective vertex in the expander graph is determined based on aspects of a particular segment of a subset, wherein the expander graph comprises a graph of supersingular elliptic curves over a finite field of characteristic p;
    determining a label of a last vertex walked; and
    outputting the label as a result of the hash function, wherein the hash function is collision resistant.

2. The method of claim 1, wherein the expander graph further comprises a Ramanujan graph.

3. The method of claim 1, wherein the expander graph further comprises a Lubotzky-Phillips-Sarnak expander graph.

4. The method of claim 1, wherein the result is a cryptographic hash.

5. The method of claim 1, wherein finding collisions for the hash function is computationally hard.

6. The method of claim 1, wherein the input message has a certain degree of entropy.

7. The method of claim 1, wherein the expander graph comprises n vertices, wherein the input message has a degree of entropy, and wherein the method further comprises:
    assigning a respective label to vertices of the graph;
    determining the degree of entropy;
    wherein walking further comprises walking the n vertices using the degree of entropy to identify completely random vertex output; and
    wherein the output is a respective assigned label of a last vertex of the n vertices walked, whereby the label of the last vertex is a result of a hash function.

8. The method of claim 7, wherein determining the degree of entropy further comprises using an extractor function to determine a degree of randomness associated with the input message.

9. A computer storage media comprising computer-programmed instructions executable by a processor for:
    dividing a message into segments;
    walking an expander graph according to input to a hash function, the expander graph being walked using respective ones of the segments to determine a path to a next vertex of n vertices in the expander graph, wherein the expander graph is a Lubotzky-Phillips-Sarnak expander graph;

determining a label of a last vertex walked; and outputting the label as a result of the hash function.

10. The computer storage media of claim 9, wherein the expander graph is a Ramanujan graph.

11. The computer storage media of claim 9, wherein the result is a cryptographic hash.

12. The computer storage media of claim 9, wherein finding collisions for the hash function is computationally hard.

13. The computer storage media of claim 9, wherein the message is divided into the segments based on a degree of entropy extracted from the message.

14. The computer-storage media of claim 9, wherein the expander graph comprises n vertices, wherein the message has a degree of entropy, and wherein the computer-program instructions further comprising structures for:

assigning a respective label to vertices of the graph;

determining the degree of entropy;

wherein walking further comprises walking the n vertices using the degree of entropy to identify completely random vertex output; and wherein the output is a respective assigned label of a last vertex of the n vertices walked, whereby the label of the last vertex is a result of a hash function.

15. The computer storage media of claim 9, wherein the computer-programmed instructions for determining the degree of entropy further comprises instructions for using an extractor function to determine a degree of randomness associated with the message.

16. A computing device comprising:

a memory coupled to the processor, the memory comprising computer-program instructions executable by the processor for:

assigning a respective label to respective ones of n vertices in an expander graph;

dividing an input message into segments;

walking the expander graph as input to a hash function, the expander graph being walked using respective ones of the segments to determine a path to a next vertex of the n vertices in the expander graph, wherein determining the path to the next vertex in the walk is performed by reading bits from a next segment to determine which edge traversed from the current vertex, wherein the expander graph is selected from a group consisting of a graph of supersingular elliptic curves over a finite field of characteristic p, a Ramanujan graph and a Lubotzky-Phillips-Sarnak expander graph;

determining a label of a last vertex of the vertices walked; and outputting the label as a result of the hash function.

17. The computing device of claim 16, wherein the result is a cryptographic hash.

* * * * *

UNITED STATES PATENT AND TRADEMARK OFFICE
CERTIFICATE OF CORRECTION

| | | |
|---|---|---|
| PATENT NO. | : 7,382,876 B2 | Page 1 of 1 |
| APPLICATION NO. | : 11/263701 | |
| DATED | : June 3, 2008 | |
| INVENTOR(S) | : Kristin E. Lauter et al. | |

It is certified that error appears in the above-identified patent and that said Letters Patent is hereby corrected as shown below:

In column 11, line 16, in Claim 14, delete "computer-storage" and insert -- computer storage --, therefor.

Signed and Sealed this

Nineteenth Day of April, 2011

David J. Kappos
*Director of the United States Patent and Trademark Office*